A. H. ISHAM.
BARN AND STABLE FLOOR SCRAPER.

No. 175,610. Patented April 4, 1876.

Witnesses.
J. M. Howe
Peter Dix

Inventor.
Alfred H. Isham
By Wm. S. Loughborough
Atty.

UNITED STATES PATENT OFFICE.

ALFRED H. ISHAM, OF AVON, NEW YORK.

IMPROVEMENT IN BARN AND STABLE FLOOR SCRAPERS.

Specification forming part of Letters Patent No. 175,610, dated April 4, 1876; application filed March 3, 1876.

*To all whom it may concern:*

Be it known that I, ALFRED H. ISHAM, of Avon, in the county of Livingston and State of New York, have invented a new and useful Barn and Stable Floor Scraper; and I do hereby declare that the following is a full, clear, and exact description thereof, reference being had to the accompanying drawings, making part of this specification, in which—

Figure 1:
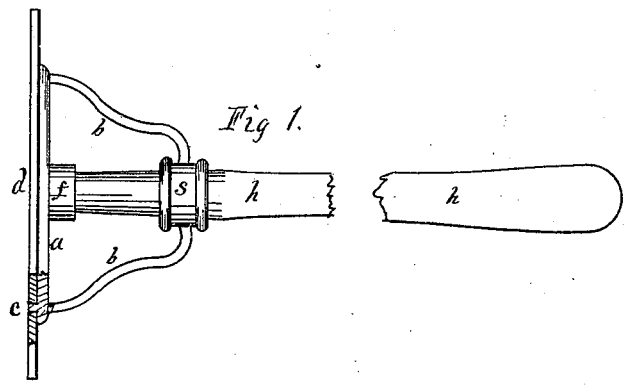
Figure 2:
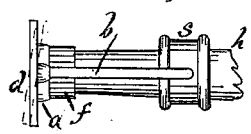

Figure 1 is a sectional top view of my invention. Fig. 2 is a vertical section of the same.

The object of this invention is to provide a simple and durable implement, to be substituted for the ordinary barn-shovel for cleaning barn and stable floors. It consists in the employment of a metallic socketed brace-stock to receive a wooden handle, and to which is attached a light metal plate or blade.

About the only substitute for the ordinary barn-shovel for cleaning stables and barn-floors heretofore proposed has been a piece of plank with a hole bored through it, and a handle inserted to shove it by. This was a very clumsy, awkward thing to handle, and was necessarily frail unless made quite heavy.

I preferably employ a malleable-iron stock, $a$. The handle-sockets and braces $b$ are formed with it. There may be pivots formed upon the face of the stock $a$, as shown at $c$, Fig. 1, and the thin plate $d$ provided with two perforations corresponding therewith, and by this means the plate riveted to the stock; or, if preferred, there might be rivets put through both. Light sheet-iron might be used for the blade or plate $d$ by corrugating it lengthwise, or by folding the edges, it would be very much stiffened. The socket $f$ receives the end of the handle $h$, which may be of wood, after passing through the brace-socket $s$. There may be a nail or pin driven into the handle just below the socket, or through one side of it. The braces might be formed of a single wire, if desired, by making a full coil to form the socket $s$, and passing the ends through the blades, or the stock and blade. The stock and blade or plate $d$ may be made angling vertically with relation to the handle, as indicated by the dotted line.

The implement is designed to be pushed by the workman.

I do not claim a hoe or implement composed of a blade attached to its handle by fastenings interlocked therewith, and secured thereto by a ferrule passed over the said handle, as shown in the patent of C. R. Howell, December 29, 1868, and numbered 85,384; but

What I claim as my invention is—

The implement herein shown and described, being composed of the stock $a$ and socket $f$, brace-bars $b$, and socket $s$, formed in one piece of metal, and the blade $d$, in combination with the handle $h$, for the purposes set forth.

In witness that I claim the foregoing as my invention, I have hereunto subscribed my name in presence of two witnesses.

ALFRED H. ISHAM.

Witnesses:
WM. S. LOUGHBOROUGH,
N. A. PIERCE.